United States Patent [19]

Brand et al.

[11] 4,381,191

[45] Apr. 26, 1983

[54] DRILLING MUD DEGASSER

[76] Inventors: LaVoice B. Brand, 117 Ruskin, Chickasha, Okla. 73018; Robert L. Brand, P.O. Box 135, Alex, Okla. 73002

[21] Appl. No.: 277,019

[22] Filed: Jun. 24, 1981

[51] Int. Cl.³ .......................................... B01D 19/00
[52] U.S. Cl. ...................................... 55/193; 55/194; 55/202
[58] Field of Search ............... 55/52, 188, 193, 194, 55/201, 202

[56] References Cited

U.S. PATENT DOCUMENTS

| | | | |
|---|---|---|---|
| 1,452,253 | 4/1923 | Nevitt | 55/202 |
| 2,142,270 | 1/1939 | Henst | 55/193 |
| 2,748,884 | 6/1956 | Erwin | 55/193 |
| 3,226,916 | 1/1966 | Bradford et al. | 55/193 |
| 3,241,295 | 3/1966 | Griffin et al. | 55/193 X |
| 3,325,974 | 6/1967 | Griffin et al. | 55/193 X |
| 3,368,330 | 2/1968 | Elliott et al. | 55/193 |
| 3,481,113 | 12/1969 | Burnham, Sr. | 55/193 X |
| 3,789,579 | 2/1974 | El-Hindi | 55/193 X |
| 3,831,352 | 8/1974 | Parcels | 55/193 |
| 3,898,061 | 8/1975 | Brunato | 55/193 |
| 4,002,432 | 1/1977 | Brice et al. | 55/185 X |
| 4,272,258 | 6/1981 | Shifflett | 55/52 |

OTHER PUBLICATIONS

P. 9, II-2 and V-8 of Drilco manual.

*Primary Examiner*—Robert H. Spitzer
*Attorney, Agent, or Firm*—Dunlap & Codding

[57] ABSTRACT

Disclosed is a drilling mud degassing apparatus which comprises a tank wherein a plurality of vertically spaced partitions are disposed for flowing drilling mud deposited on the uppermost partition consecutively across the upper surfaces of the partitions. The uppermost and lowermost partitions have peripheral edges spaced from the wall of the tank and an intermediate partition is provided which has a periphery engaging the wall of the tank and a central opening such that mud is flowed alternatively radially outwardly and radially inwardly in traversing the tank. The apparatus further includes a pump assembly which draws mud from a mud pit and forces the mud in a jet on to central portions of the upper partition. Tubes extending through a cover portion of the tank and having openings into chambers between the partitions discharge gas from the tank and mud is discharged from the tank via a mud outlet adjacent the lower end of the tank.

6 Claims, 5 Drawing Figures

FIG. 2 is a cross section in side elevation of the tank and partition system of the degasser.

FIG. 3 is a cross section of the degasser taken along line 3—3 of FIG. 2.

FIG. 4 is a cross section of the degasser taken along line 4—4 of FIG. 2.

FIG. 5 is a cross section of the degasser taken along line 5—5 of FIG. 2.

DESCRIPTION OF THE PREFERRED EMBODIMENT

Referring now to the drawings in general and to FIG. 1 in particular, shown therein and designated by the general reference numeral 10 is a drilling mud degassing apparatus emplaced over a mud pit 12 containing drilling mud to be degassed. The drilling mud degassing apparatus 10 can be supported above the mud pit 12 by any suitable means; for example, by means of a wire mesh cover 14 for the mud pit 12.

The drilling mud degassing apparatus 10 generally comprises a tank assembly 16 and a pump assembly 18 by means of which drilling mud is pumped through the tank assembly 16. For this purpose, the pump assembly 18 comprises a conventional submersible pump 20 which is disposed within the drilling mud to be degassed, the pump 20 being driven by a shaft 22 which extends upwardly from the pump 20 inside a tubular support 24 to a pump drive 26. The pump drive 26 is a conventional electric motor and pulley system which need not be described for purposes of the present disclosure. The pump 20 has an inlet 28 for drawing drilling mud from the pit 12 and the pump 20 discharges such mud into a mud input conduit 30 which extends upwardly alongside the tank assembly 16 for injecting mud into upper portions thereof. Drilling mud is returned to the pit 12 via a discharge conduit 32, one end of which is connected to lower portions of the tank assembly 16 and is bent so that the other end thereof extends through the cover 14 to direct drilling mud which has been passed through the tank assembly 16 back to the mud pit 12.

As more particularly shown in FIG. 2, the tank assembly 16 comprises a tank 34 in which is disposed a plurality of partitions which are mounted within the tank 34 as will be discussed below. The tank 34 comprises a tubular wall 36 which is mounted above the mud pit 12 about a substantially vertical axis 38. A cover 40 is provided at the upper end 42 of the tank 34 and a circular aperture 44, substantially centered on the axis 38, is formed through central portions of the cover 40 so as to provide a mud inlet for the tank 34. As indicated by FIGS. 1 and 2, a portion 46 of the mud input conduit 30 is directed over the tank 34 and a right angle bend is formed in the mud input conduit 30 above the central portion of the tank 34 so that a portion 48 of the mud input conduit 30 extends through the mud inlet 44 as is particularly shown in FIG. 2. (The mud input conduit 30 can conveniently be constructed in selections held together by conventional clamps, indicated at 49, 51 and 53 in FIG. 1, for ease of mounting the drilling mud degasser 10 above the mud pit 12.) The end 50 of the portion 48 of the mud input conduit 30 is open to form a discharge opening for mud pumped into the mud input conduit 30 by the pump 20.

The tank 34 further comprises a floor portion 52 which extends across portions of the tank 34 adjacent the lower end 54 thereof so as to close the lower end 54 of the tank 34. Adjacent the lower end 54 of the tank 34, a mud outlet 56 is formed in the wall 36 of the tank 34 to receive a portion of the discharge conduit 32. The discharge conduit 32 and the portion 48 of the mud input conduit 30 can be conveniently secured to the tank 34 by welding such conduits into the mud inlet 44 and the mud outlet 56.

As shown in FIG. 2, the floor portion 52 of the tank 34 is disposed on a slope for a purpose to be discussed below. At the present, it will suffice to note that the lower end of the floor portion 52 is positioned adjacent the mud outlet 56 and that the slope of the floor portion 52 is preferably at an angle of at least 4° to the horizontal.

As further shown in FIG. 2, a plurality of apertures 58 are formed through the cover portion 40 of the tank 34, the apertures 58 being disposed adjacent the wall 36 of the tank 34. In the preferred embodiment of the present invention the cover portion 40 of the tank 34 is provided with two such apertures 58 and a tube 60 is disposed in each of the apertures 58 so as to extend through the cover portion 40 of the tank 34. As will be discussed more fully below, the tubes 60 provide a means for discharging gas evolved from drilling mud, within the tank 34, from the tank 34, the upper ends 62 of the tubes 60 being open for this purpose. The tubes 60 can be conveniently secured to the tank 34 by welding portions of the tubes 60 adjacent the apertures 58 to the cover portion 40 of the tank 34.

In the preferred form of the present invention, the tank 34 contains three partitions 64, 66 and 68 which are mounted substantially horizontally within the tank 34 to divide the interior of the tank into a series of vertically stacked compartments 70-76 between the upper end 42 and lower end 54 thereof. In particular, the uppermost partition 64 and the cover portion 40 of the tank 34 form the compartment 70; the uppermost partition 64 and the partition 66 which is the intermediate one of the three partitions 64-68 forms the compartment 72; the partition 66 and the lowermost partition 68 form the compartment 74; and the lowermost partition 68 and the floor portion 52 of the tank 34 form the compartment 76. As will be described below, during the operation of the drilling mud degassing apparatus 10, gas is evolved from mud within each of the compartments 70-76 and the interiors of the tubes 60 are fluidly communicated with the compartments 70-76 to discharge the evolved gas from the tank 34. In particular, the tubes 60 extend through each of the partitions 64-68 so that the lower ends 78 of the tubes 60 are disposed within the lowermost compartment 76 formed in the tank 34. The ends 78 of the tubes 60 are open and are disposed near the top of the compartment 76 such that gas evolved in the compartment 76 will enter the tubes 60 for discharge to the atmosphere. Similarly, openings 80-84 are formed in the walls of each of the tubes 60, the opening 80 being disposed adjacent the intermediate partition 66 so as to be adjacent the upper end of the compartment 74, the opening 82 being disposed adjacent the uppermost partition 64 so as to be adjacent the uppermost end of the compartment 72 and the opening 84 being disposed adjacent the cover portion 40 of the tank 34 so as to be adjacent the upper end of the compartment 70.

FIGS. 3, 4 and 5 have been provided to illustrate the construction and mounting of the partitions 64–68 within the tank 34. Referring first to FIG. 3, in conjunction with FIG. 2, the uppermost partition 64 comprises a flat, circular plate 63, the central portion of which is disposed below the lower end of the portion 48 of the

DRILLING MUD DEGASSER

BACKGROUND OF THE INVENTION

1. Field of the Invention

The present invention relates generally to devices for degassing liquids and, more particularly, but not by way of limitation, to devices for removing natural gas from drilling mud.

2. Brief Discussion of the Prior Art

It is a common practice in the drilling of an oil or gas well to circulate drilling mud through the well while drilling proceeds. The mud is stored in a mud pit from which it may be drawn for injection into the drill string and, after circulating through the bore of the well, the mud is returned to the mud pit.

The drilling mud serves several purposes; for example, lubrication of the drill bit and the removal of drill cuttings from the well. An important purpose served by passing drilling mud through the well is to maintain a hydrostatic pressure in lower portions of the bore to prevent the large scale release of natural gas, which can present a hazzard to drillers, into the well bore from porous formations that are penetrated by the drill. The hydrostatic pressure provided by the drilling mud is adjusted by varying the density of the mud to counter gas pressure in the formation so that the mud has the effect of sealing the intersection between the formation and the well bore. The result is that the mud limits the quantity of natural gas that can be released by the formation into the well bore.

In limiting the quantity of gas that is released into the well bore, the drilling mud will entrain some gas so that the fluid leaving the well is often in the form of a gas-drilling mud emulsion. The gas entrapped in the mud can give rise to various problems. For example, such gas can change the consistency of the mud sufficiently to interfere with the operation of pumps that are used to deliver the mud to the well and, more importantly, the gas can have a considerable, and undesirable, effect on the density of the mud. In particular, the gas-drilling mud emulsion can have a considerably lower density than the drilling mud alone with the result that the hydrostatic pressure in lower portions of the well bore can be decreased sufficiently to permit large quantities of gas to be released into the bore so as to give rise to the hazzards that the use of mud is, in part, designed to prevent.

It has, accordingly, become standard practice to degas the drilling mud after it has been returned from the well and prior to the reuse of the mud in the well. Several approaches have been taken to accomplish this degassing. In some devices, the mud is flowed over a plurality of baffles in an evacuated chamber as has been disclosed in U.S. Pat. No. 3,325,974 to Griffin III, et al. and in U.S. Pat. No. 3,898,061 to Brunato. Of course, it will be recognized that the use of a vacuum in these devices will increase both the cost of construction and operation of degassers of this type. Another approach has been to spray the mud in a diverging circular sheet at high velocity inside a chamber so that the impact of the mud with the walls of the chamber will cause separation of the gas from the mud. Devices of this type are manufactured by the Drilco Division of Smith International, Inc. of Oklahoma City, Okla. In the devices manufactured by Drilco, the mud is pumped from the mud pit into a riser pipe which has an upper end spaced a selected distance below a spray valve to turn the mud into a horizontal sheet which sprays out from the separation between such upper end of the riser pipe and spray valve to impact against the walls of a container wherein the valve is disposed. Such impact is used as a means for liberating gas from the mud. For best results, the distance between the upper end of the riser pipe and the spray valve is adjusted in relation to the rate of flow of the mud through the degasser.

While the prior art degassers have generally proven to be effective devices, they have also generally involved trade-offs between effectiveness and complexity of either construction or use. In general, it has not been possible, prior to the present invention, to provide a degasser which is simple in construction, easy to use and, at the same time, highly effective in the removal of natural gas from drilling mud.

SUMMARY OF THE INVENTION

The present invention is a highly effective drilling mud degasser which eliminates any need for adjustment of working parts and operates without the use of evacuated chambers. In particular, the degasser of the present invention comprises a tank wherein are mounted a plurality of partitions forming a plurality of vertically stacked compartments between the upper end and the lower end of such tank. Drilling mud to be degassed is pumped into the tank via a conduit disposed above the uppermost partition so that the drilling mud exits the conduit in the form of a jet which impinges upon the upper surface of such uppermost partition. The mud spreads out over the uppermost partition from the region of impact and thereafter flows over the upper surfaces of remaining partitions to an outlet which is disposed at the lower end of the tank. It has been found that the coactive effect of initially driving the mud against the uppermost partition in the form of a jet, so as to cause a relatively violent agitation of the mud across such uppermost partition, and subsequently flowing the mud across remaining partitions within the tank will result in the removal of substantially all of the gas which is entrained within the drilling mud under normal operating conditions. Thus, the degasser of the present invention is both simple in construction and operation and, at the same time, highly effective in the removal of gas from drilling mud.

An object of the present invention is to provide an effective drilling mud degasser which is simple in construction and operation.

Another object of the present invention is to eliminate the need, in a degasser of the use of evacuated chambers to enhance the evolution of gas from the drilling mud.

Still a further object of the present invention is to provide a drilling mud degasser which requires no adjustment to meet the condition under which such degasser is used.

Other objects, advantages and features of the present invention will become clear from the following detailed description of the preferred embodiment of the invention when read in conjunction with the drawings and appended claims.

Figure 3:
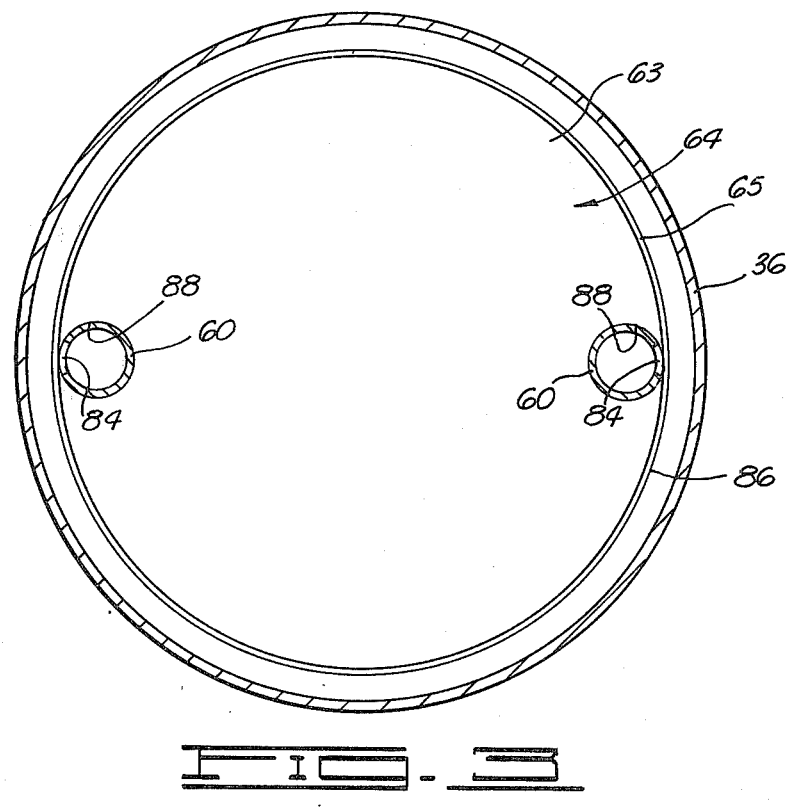

mud input conduit 30 which forms the discharge opening for such conduit into the tank 36. A flange 65 is attached to the edge of the plate 63 and extends downwardly therefrom a distance substantially equal to the diameters of the openings 82 in the tubes 60 so as to trap gas enclosed within the chamber 72 in upper portions thereof for discharge to the atmosphere via the openings 82 and the open upper ends 62 of the tubes 60. As shown particularly in FIG. 3, the uppermost partition 64 has a peripheral edge 86, formed by the outer peripheral surface of the flange 65, which is concentric with and spaced a short distance from the inner surface of the wall 36 of the tank 34. Two apertures 88 are formed through the partition 64 at opposite ends of a diameter thereof and adjacent the flange 65 so as to receive the tubes 60 through the partition 64. The partition 64 can be conveniently mounted within the tank 34 by welding the partition 64 to the tubes 60.

Figure 2:
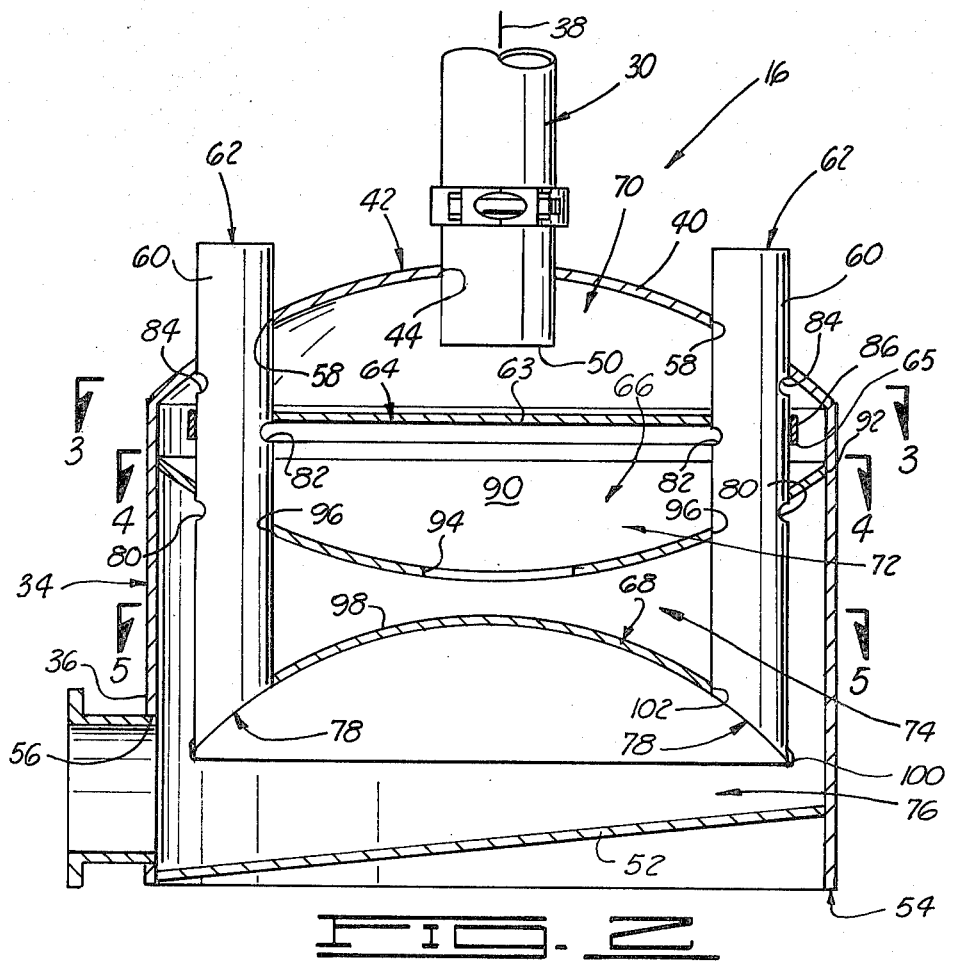
Figure 4:
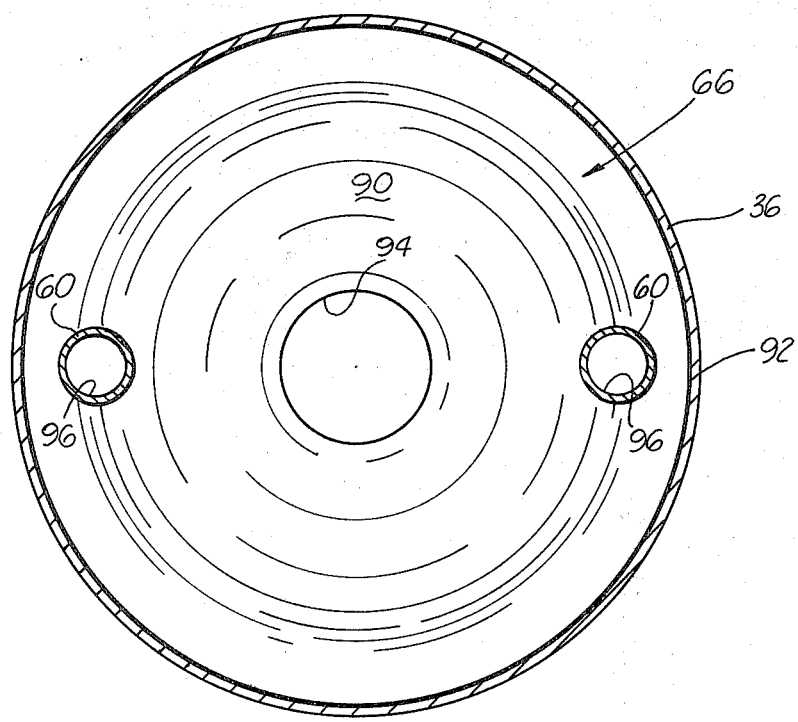

As shown in FIGS. 2 and 4, the intermediate partition 66 is a circular lamella having a concave upper surface 90 and a periphery 92 which extends to the wall 36 of the tank 34 to which the periphery 92 of the partition 66 is welded. A central opening 94 is formed through the partition 66 about the axis 38 for a purpose to be described below. Near the periphery 92 of the partition 66, apertures 96, angularly spaced approximately 180° about the axis 38, are formed through the partition 66 so as to pass the tubes 60 therethrough. The tubes 60 can be conveniently secured to the partition 66 by welding the tubes 60 thereto.

Figure 5:
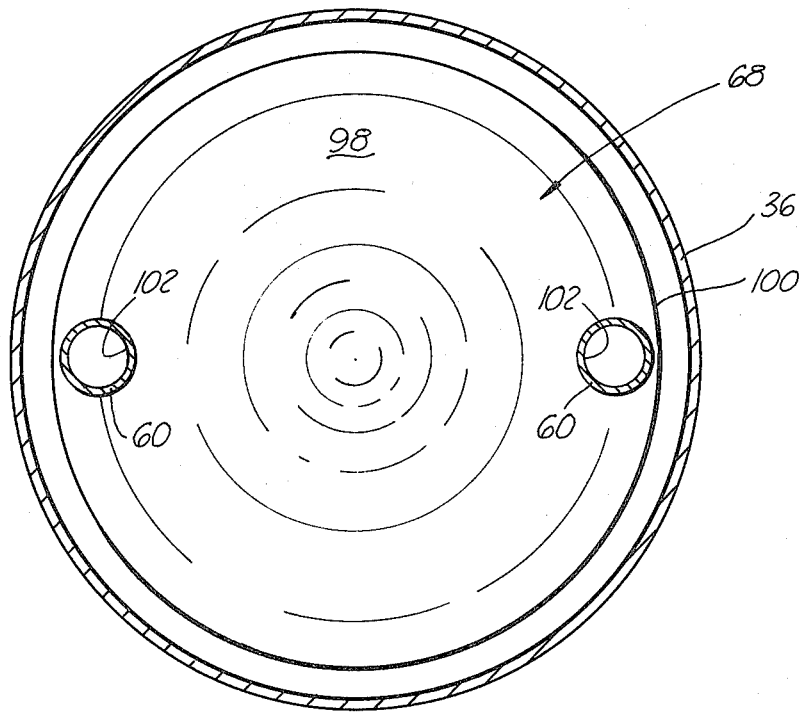

As is shown particularly in FIGS. 2 and 5, the lowermost partition 68 is a circular lamella having a convex upward surface 98 and having a peripheral edge 100 which, like the peripheral edge 86 of the uppermost partition 64, is spaced a distance from the inner surface of the wall 36 of the tank 34. Apertures 102, angularly spaced approximately 180° about the axis 38, are formed through the partition 68, near the peripheral edge 100 thereof, to receive the tubes 60 through the partition 68. The partition 68 can be conveniently mounted in the tank 34 by welding the partition 68 to the tubes 60.

As will be clear from the above description of the partitions 64–68, the partitions 64–68 are provided with alternative general structures. That is, the uppermost and lowermost partitions, 64 and 68 respectively, have unpunctured central portions and peripheral edges that are disposed near, but spaced from, the inner surface of the wall 36 of the tank 34. The peripheral edge 92 of the intermediate partition 66, on the other hand, engages the wall 36 of the tank 34, so that no spacing between the edge 92 and the inner surface of the wall 36 is provided, and the intermediate partition 66 is provided with a central aperture 94. Moreover, the partitions having these alternative structures are positioned alternately within the vertical arrangement of partitions in the tank 34. That is, adjacent partitions have alternative general structures.

OPERATION OF THE PREFERRED EMBODIMENT

Figure 1:
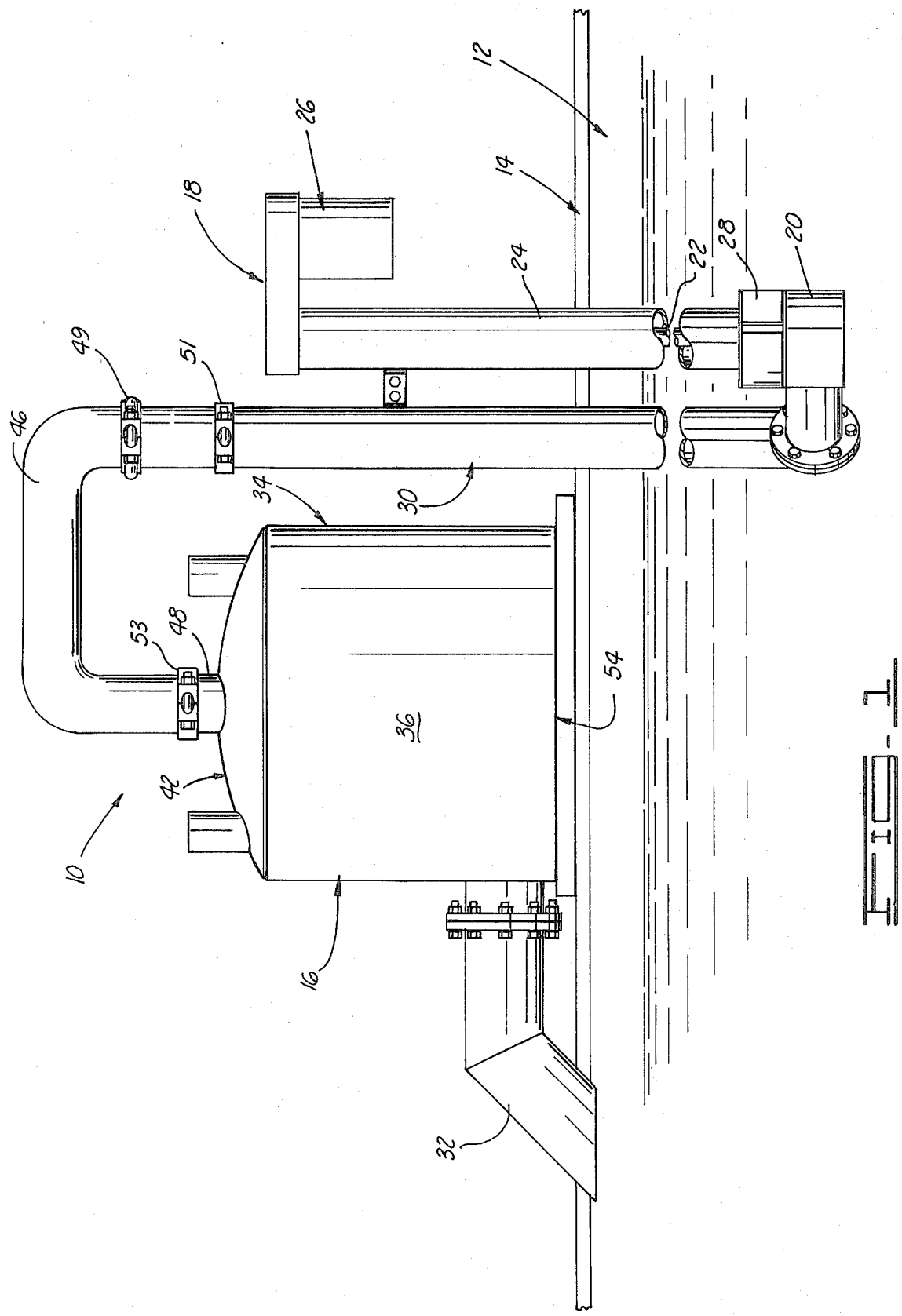
FIG. 1 is a side elevational view of the degasser of the present invention showing the mounting of the degasser above a mud pit.

The operation of the drilling mud degassing apparatus 10 can best be understood with reference to FIGS. 1 and 2. At such times that is desired to remove natural gas which has been entrained in drilling mud, the pump drive 26 is activated to turn the shaft 22 so as to draw drilling mud into the inlet 28 of the pump 20. The mud drawn into the pump 20 is discharged into the mud input conduit 30 and is conducted thereby to the mud inlet of the tank 34 into which the upper end of the mud input conduit 30 extends as has been described above. The mud is then discharged through the discharge end 50 of the mud input conduit 30 against the central portion of the uppermost partition 64. In particular, the flow rate of the pump 20 and the diameter of the portion 48 of the mud input conduit 30 are selected so that the mud issuing from the mud input conduit 30 moves toward the uppermost partition 64 at a relatively high velocity in the form of a jet. In one preferred embodiment of the present invention, such jet formation has been achieved by operating the pump 20 so as to deliver approximately 450 gallons of mud per minute through a portion 48 of the mud input conduit 30 having a diameter of approximately six inches.

The drilling mud impinges upon the upper surface of the uppermost partition 64 and spreads out across such surface toward the peripheral edge 86 of the partition 64. Because of the formation of a jet of mud on to the upper surface of the partition 64, such spreading of the mud is accompanied by a violent agitation of the mud along the upper surface of the partition 64 to evolve a large proportion of gas entrained within the mud as the mud moves radially outwardly along the partition 64. In particular, viscous drag on the mud as the mud spreads out across the uppermost partition 64 results in a shearing effect throughout the body of the mud and such shearing effect has been found to be highly effective in causing a large proportion of the gas entrained in the mud to be released within the chamber 70. Such gas enters the tubes 60 via the openings 84 and is discharged into the atmosphere via the open ends 62 of the tubes 60.

When the mud reaches the peripheral edge 86 of the uppermost partition 64, the mud falls under the influence of gravity to portions of the intermediate partition 66 disposed adjacent the wall 36 of the tank 34 and gravitates along the upper surface 90 of the intermediate partition 66 toward the aperture 94 formed in the center of the intermediate partition 66. The mud then passes through the aperture 94 to fall to the central portion of the lowermost partition 68 and spreads out along the upper surface 98 of the lowermost partition 68 to the peripheral edge 100 thereof, whence the mud is deposited on the floor portion 52 of the tank 34. The mud then moves along the slope of the floor portion 52 to be discharged from the tank 34 via the mud outlet 56 and is returned via the discharge conduit 36 to the mud pit 12. As the mud traverses the upper surfaces of the partitions 66 and 68 and the floor portion 52 of the tank 34, further gas is evolved from the mud and is discharged from the tank via the tubes 60. That is, gas evolved in the chambers 72 and 74 enters the interiors of the tubes 60 via the openings 80 and 82 and gas evolved in the chamber 76 enters the tubes 60 via the open lower ends 78 thereof to be subsequently discharged from the tubes 60 through the open upper ends 62 of the tubes 60.

It has been found that the initial agitation and shearing of the mud along the upper surface of the uppermost partition 64, by forcing the mud against the uppermost partition 64 in the form of a jet, and the subsequent flowing of the mud across the upper surfaces 90 and 98 of the intermediate and lowermost partitions, 66 and 68 respectively and across the floor portion 52 of the tank 34 results in a coactive effect on the mud that causes the drilling mud degassing apparatus 10 to provide an extremely effective means for degassing drilling mud. Following the initial impact of the drilling mud on the uppermost partition 64, the mud will spread out across the partition 64 as a relatively rapidly moving sheet across the upper surface of the partition 64. The viscous drag on the mud, as it moves across the partition 64, causes internal shearing of the mud which releases the gas in the form of many small bubbles within the mud. Moreover, the mud will be slowed by the viscous forces as it spreads out across the uppermost partition 64 so that, the mud will tend to move more slowly across the upper surfaces 90 and 98, respectively, of the partitions 66 and 68. Such slowing is enhanced by increasing the surface areas of the upper surfaces 90 and 98 of the partitions 66 and 68, respectively, via the shaping of such partitions to have, respectively, concave and convex upper surfaces. Such shaping of the partitions 66 and 68 also has the advantage of trapping gas evolved from the mud in the chambers 74 and 76 within such chambers to eliminate a backflow of gas through the tank 34 which could result in a re-entrainment of the gas in the drilling mud. The slower flow of the mud across the partitions 66 and 68 and the floor portion 52 of the tank 34 permits the bubbles to rise to the surface of layers of mud flowing across the partitions 66 and 68 and burst to release the gas. Thus, the coactive effect of driving the mud against one partition, to spread out at a relatively high speed thereacross, followed by a slower flow of mud across surfaces of additional partitions results in the removal of substantially all of the gas which is entrapped in the mud.

It will often occur that cuttings from the drilling process will be deposited in the mud pit 12 along with the drilling mud and such cuttings will be picked up by the pump 20 and delivered to the tank 34. It has been found that sloping the floor portion 52 of the tank 34 as specified above, results in a highly effective means of washing the cuttings from the floor portion 52 into the mud outlet 56 for removal of such cuttings from the tank 34.

It is clear that the present invention is well adapted to carry out the objects and obtain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. An apparatus for degassing drilling mud, comprising:
   a tank having an upper end and a lower end, wherein a mud inlet is formed in central portions of the upper end of the tank and a mud outlet is formed in lower portions of the tank;
   a plurality of partitions mounted in the tank between the mud inlet and the mud outlet so as to form a plurality of vertically stacked compartments between the upper and lower ends of the tank, wherein alternate partitions are characterized as alternatively having a peripheral edge spaced from the inner surface of the wall of the tank and a central aperture formed therethrough, the uppermost partition being of the type having a peripheral edge spaced from the wall of the tank;
   pumping means for directing a jet of the drilling mud to be degassed against central portions of said uppermost partition via said mud inlet, the pumping means comrpising:
      a mud input conduit having a discharge opening disposed above the uppermost partition, the mud input conduit extending through the mud inlet, across a portion of the upper end of the tank and downwardly along side the tank to a mud pit wherein said drilling mud to be degassed is disposed;
      a submersible pump disposed in said mud pit and connected to the mud input conduit for forcing drilling mud from the mud pit into the mud input conduit; and
      means for driving the submersible pump; and
   means for discharging gas evolved from said drilling mud from said tank
wherein the tank is characterized as having a cover portion attached to said wall and extending across the upper end of the tank; wherein the mud inlet is formed in central portions of said cover portion; wherein a plurality of apertures are formed through said cover portion of the tank adjacent the wall thereof; and wherein the means for discharging gas from the tank comprises a plurality of tubes extending through said apertures in the cover portion, said tubes having means fluidly communicating the interiors thereof with the interior of the tank and said tubes having open upper ends disposed above the tank.

2. The apparatus of claim 1 wherein the mud outlet is formed in the wall of the tank adjacent the lower end thereof and wherein the tank is characterized as having a floor portion disposed within said wall and extending across lower portions of the tank, said floor portion positioned so as to slope downwardly toward the mud outlet.

3. The apparatus of claim 2 wherein the slope of said floor portion is characterized as being at an angle of at least 4° to the horizontal.

4. The apparatus of claim 1 wherein the means fluidly communicating the interiors of the tubes with the interior of the tank is characterized as comprising an open lower end of each tube disposed in the lowermost compartment formed in the tank and openings formed in portions of the walls of each of the tubes disposed in each of the others of said compartments.

5. The apparatus of claim 4 wherein said openings are formed in portions of the tubes adjacent the upper ends of the compartments wherein said portions of the tubes are disposed.

6. The apparatus of claim 1 wherein said partitions include:
   a lamellar intermediate partition disposed adjacent to and below the uppermost partition and having a concave upper surface and a central aperture formed therethrough; and
   a lamellar partition disposed below and adjacent to said intermediate partition and having a convex upper surface and a peripheral edge spaced from the wall of the tank.

* * * * *